Nov. 7, 1961 J. KINGSBURY 3,008,002

PICK-UP TUBE MOUNTING ARRANGEMENT

Filed Dec. 22, 1958

Inventor
John Kingsbury
By
Holcombe, Wetherill & Brisebois
Attorneys

United States Patent Office 3,008,002

Patented Nov. 7, 1961

3,008,002

PICK-UP TUBE MOUNTING ARRANGEMENT

John Kingsbury, Cambridge, England, assignor to Pye Limited, Cambridge, England, a British company Filed Dec. 22, 1958, Ser. No. 782,147
Claims priority, application Great Britain Dec. 24, 1957
8 Claims. (Cl. 178—7.2)

Figures 1, 2:
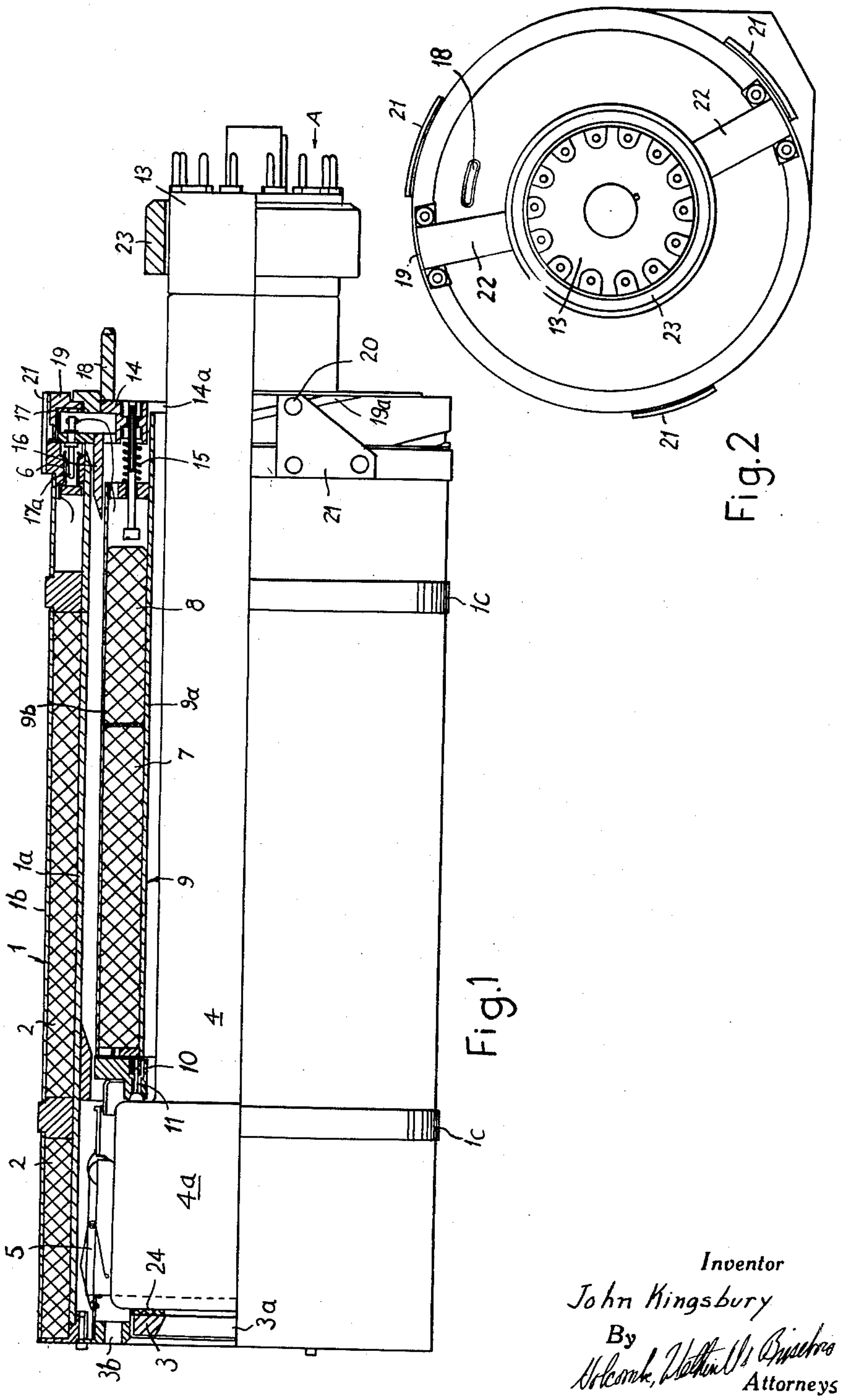

The present invention relates to television cameras and more particularly to an arrangement for mounting a pick-up tube within a television camera.

It is an object of the present invention to provide a mounting arrangement which enables a pick-up tube to be quickly inserted into and removed from a television camera for replacement, for cleaning or other servicing.

According to the present invention, an arrangement for mounting a pick-up tube within a television camera consists of a cylindrical support carrying a focus coil or coils for the pick-up tube which is adapted to receive the pick-up tube and its associated deflection coil or coils within its bore, the arrangement being such that the tube and its associated deflection coil or coils can be inserted into or withdrawn from the bore of the focus coil as a unit, without removing the focus coil assembly from the television camera.

The casing of the camera is provided with a rear aperture, flap or door, which is large enough to allow the insertion and withdrawal of the pick-up tube and its associated deflection coil or coils.

The cylindrical support carrying the focus coil or coils is preferably mounted on the tube mounting carriage provided with mechanical means for controlling the movement of the tube for focussing. The cylindrical support may consist of inner and outer concentric cylinders of insulating material, with the focussing coil or coils mounted between the two cylinders.

Advantageously, the deflection coil or coils are also mounted in the space between further inner and outer concentric cylinders of insulating material adapted to surround the neck of the pick-up tube and themselves fit within the bore of the focus coil support. Alignment coils may also be disposed within the space between these further inner and outer cylinders.

The end of the focus coil assembly adjacent the face of the pick-up tube is provided with a plate having a central aperture through which the light from an image enters the pick-up tube, and this front plate may also be provided with slots through which air can pass to cool and ventilate the tube assembly.

Preferably the rear end of the pick-up tube projects from the other end of the focus coil assembly and is surrounded by an annular connector member carrying electrical connections to the deflection coils and possibly to the focus coils and/or other electrodes of the pick-up tube. This annular connector member comprises one element of a plug and socket connector, the complementary connector elements being carried from the rear end of the focus coil support.

An annular locking ring may also be arranged at the rear end of the focus coil support which serves to lock the tube in position within the bore of the support between the apertured end plate and the locking ring. The locking ring may be rotatable relative to the focussing coil support and is arranged so that when the annular connector member is engaged on the back of the support, the ring can be twisted to clamp the connector member in position and also hold the tube in position. Advantageously resilient means may be provided so that a resilient loading or clamping is imparted to the pick-up tube upon the locking of the ring.

In order that the invention may be more fully understood, reference will be made to the accompanying drawing, in which:

FIGURE 1 is an elevational view partly in section of one form of pick-up tube mounting arrangement according to the invention and FIGURE 2 is a rear view of the assembly taken in the direction of the arrow A in FIGURE 1.

Referring to the drawing, the focus coil assembly generally indicated at 1, consists of inner and outer concentric cylinders 1*a*, 1*b* of insulating material with the focus coils 2 mounted therein. Projecting beyond the outer cylinder 1*b* are rings 1*c* which engage with the tube mounting carriage (not shown), having controls for movement of the tube for focussing. At the end of the assembly 1 adjacent to the lens system, is a front plate 3 of insulating material which serves as a front stop for the pick-up tube 4. This plate has a large central aperture 3*a* for the image light path, and arcuate slots 3*b* around the edge to provide an exit for air passing inside the assembly for cooling the tube. Around the enlarged target end 4*a* of the tube 4 there may be heaters and thermostats 5 to establish the correct working temperatures. The plate 3 may be adjustable in the axial direction of the tube 4 to allow for adjustment of the photo cathode-lens infinity setting.

At the rear end of the focus coil assembly towards the base of the tube, there is an annular socket 6 with locating holes and sufficient contact sockets to feed electrical supplies to the deflection and alignment coils 7 and 8 and to the target end 4*a* of the pick-up tube, these contact sockets facing the rear of the camera casing. The leads to the annular socket 6 and to the focus coil assembly, which are separate, are arranged to allow the entire focus assembly to be moved in its carriage for focussing.

The deflection and alignment coils 7 and 8 are arranged in twin concentric cylinders 9*a*, 9*b* of insulating material, which forms an assembly 9 of small enough overall diameter to slide telescopically into the bore of the focus coil assembly 1. The inner diameter of cylinder 9*a* is sufficient to receive the narrower rear portion of the pick-up tube behind the target portion 4*a*, and the front wall of this assembly 9 is provided with an annular socket 10, comprising a ring of contact sockets spaced to locate and provide contact to the pins 11 projecting rearwardly from the wider target end 4*a* of the pick-up tube. A tube base socket (not shown) on a flexible tail, provides additional electrical connections to the pins on the base 13 of the pick-up tube after the assembly is inserted in the camera.

The rear end of the deflection coil assembly 9 fits telescopically into a deflection coil end plate assembly 14, which is spring loaded axially by means of springs 15, to provide a clamping pressure on the tube 4 when it is locked in place within the focus coil assembly. This deflection coil end plate 14 has a central aperture 14*a* to allow the rear of the pick-up tube to pass through. Around this end plate there is a deflection coil connector plug assembly comprising an outer sleeve 16 that receives the rear end of the focus coil assembly and an annular plug 17 carrying pins 17*a* facing forward to locate and provide connections through the annular socket 6 on the focus coil, so providing the necessary electrical connections for the deflection and alignment coils. The inner deflection coil end plate 14 is rotatable within this plug assembly to allow for fine adjustment of the tube assembly for picture tilt, and a lever 18 extends from the end plate to facilitate this adjustment. Around this plug assembly is a freely rotatable locking ring 19 which has on its outer surface helical grooves 19*a* which engage with pins 20 on the inner surfaces of locking plates 21 extending from the rear of the focus coil assembly. From the locking ring a bracket 22 (FIGURE 2) extends rearwardly to provide a handle and this may include a ring section 23 arranged to provide a rear tube support.

The procedure for assembly, is to insert the pick-up tube 4 into the deflector coil assembly 9 so that the pins 11 enter the front socket 10, this whole assembly can then slide into the bore of the focus coil assembly 1. The annular plug 17 and socket 6 are engaged and the locking plate pins 20 located in the locking ring grooves **19*a*. The locking ring 19 is then twisted, which clamps the assembly home so that the spring loading on the deflection coil assembly 9 clamps the front end 4*a* of the tube between the front of the deflection coil assembly and the front plate 3 of the focus coil assembly, with the interposition of a resilient ring 24**. Finally the pick-up tube base socket is placed in position.

The casing of the camera (not shown) is provided with a flap at the rear, large enough to allow the tube and deflector coil assembly to be withdrawn.

Whilst a particular embodiment has been described, it will be understood that various modifications may be made without departing from the scope of this invention. For example, the focus coils and deflection coils may be supported other than between two concentric cylinders of insulating material.

I claim:

1. An arrangement for mounting a pick-up tube within a television camera, in which the pick-up tube is of the type having a cylindrical neck portion and an enlarged cylindrical portion containing the target electrode at one end of the neck portion, said arrangement comprising an assembly including at least one deflection coil surrounding the neck portion of the tube, a further assembly extending over substantially the whole length of the pick-up tube and including at least one focus coil, said pick-up tube and at least one deflection coil carried thereby being slidable within and withdrawable from the bore of the focus coil assembly, an annular connector member surrounding the rear end of the neck portion of the pick-up tube and carrying electrical connections which engage with complementary connections carried by the rear end of the focus coil assembly, and locking means which serves to lock the tube and the annular connector member in position.

2. An arrangement for mounting a pick-up tube within a television camera, in which the pick-up tube is of the type having a cylindrical neck portion and an enlarged cylindrical portion containing the target electrode at one end of the neck portion, said arrangement comprising an assembly including at least one deflection coil surrounding the neck portion of the tube, a plurality of connections on the rear end of the enlarged portion of the pick-up tube engageable with complementary connections carried from the abutting end of the deflection coil assembly, a further assembly extending over substantially the whole length of the pick-up tube and including at least one focus coil, said pick-up tube and the at least one deflection coil carried thereby being slidable within and withdrawable from the bore of the focus coil assembly, and an annular connector member surrounding the rear end of the neck portion of the pick-up tube and carrying electrical connections which engage with complementary connections carried by the rear end of the focus coil assembly.

3. An arrangement as claimed in claim 2, in which resilient means are provided so that a resilient loading or clamping is imparted to the pick-up tube.

4. In a television camera, an arrangement for mounting a pick-up tube of the type having a cylindrical neck portion and an enlarged cylindrical portion containing the target electrode at one end of the neck portion, said arrangement comprising an assembly including deflection coils surrounding the neck portion of the tube, a plurality of connections on the rear end of the enlarged portion of the pick-up tube engageable with complementary connections carried from the abutting end of the deflection coil assembly, a further assembly extending over substantially the whole length of the pick-up tube and including at least one focus coil, said pick-up tube and the deflection coils carried thereby being slidable within and withdrawable from the bore of the focus coil assembly without removing the focus coil assembly from the television camera, an apertured plate adjacent the front end of the focus coil assembly through which light can pass to the pick-up tube an annular connector member surrounding the rear end of the neck portion of the pick-up tube and carrying electrical connections which engage with complementary connections carried by the rear end of the focus coil assembly and an annular locking ring at the rear end of the focus coil assembly which serves to lock the tube and the annular connector member in position.

5. An arrangement as claimed in claim 4, in which the locking ring is rotatable relative to the focus coil support and is arranged so that when the annular connector member is engaged on the back of the support the ring can be rotated to clamp the connector member in position and also hold the tube in position.

6. In a television camera, an arrangement for mounting a pick-up tube of the type having a cylindrical neck portion and an enlarged cylindrical portion containing the target electrode at one end of the neck portion, said arrangement comprising an assembly of two spaced concentric cylinders of insulating material surrounding the neck portion of the tube and containing between them the deflection coils and alignment coils for the pick-up tube, a plurality of connections on the rear end of the enlarged portion of the pick-up tube engageable with complementary connections carried from the abutting end of the deflection coil assembly, a further assembly of two concentric cylinders of insulating material extending over substantially the whole length of the pick-up tube and containing between them at least one focus coil, said pick-up tube and the deflection and alignment coils carried thereby being slidable within and withdrawable from the bore of the focus coil assembly without removing the focus coil assembly from the television camera, an annular connector member surrounding the rear end of the neck portion of the pick-up tube and carrying electrical connections which engage with complementary connections carried by the rear end of the focus coil assembly and an annular locking ring at the rear end of the focus coil assembly which serves to lock the tube and the annular connector member in position.

7. In a television camera, an arrangement for mounting a pick-up tube of the type having a cylindrical neck portion and an enlarged cylindrical portion containing the target electrode at one end of the neck portion, said arrangement comprising an assembly of two spaced concentric cylinders of insulating material surrounding the neck portion of the tube and containing between them the deflection coils for the pick-up tube, a plurality of connections on the rear end of the enlarged portion of the pick-up tube engageable with complementary connections carried from the abutting end of the deflection coil assembly, a further assembly of two concentric cylinders of insulating material extending over substantially the whole length of the pick-up tube and containing between them at least one focus coil, said pick-up tube and the deflection coils carried thereby being slidable within and withdrawable from the bore of the focus coil assembly without removing the focus coil assembly from the television camera, a connector member at the rear end of the neck portion of the pick-up tube carrying electrical connections which engage with complementary connections on the rear end of at least one of said deflection coil assembly and the focus coil assembly and locking means which serves to lock the tube and the connector member in position.

8. An arrangement for mounting a pick-up tube within a television camera, in which the pick-up tube is of the type having a cylindrical neck portion and an enlarged cylindrical portion containing the target electrode at one end of the neck portion, said arrangement comprising an assembly of two spaced concentric cylinders of insulating material surrounding the neck portion of the tube and containing between them at least one deflection coil for the pick-up tube, a plurality of connections on the rear end of the enlarged portion of the pick-up tube engageable with complementary connections carried from the abutting end of the deflection coil assembly, a further assembly of two concentric cylinders of insulating material extending over substantially the whole length of the pick-up tube and containing between them at least one focus coil, said pick-up tube and the at least one deflection coil carried thereby being slidable within and withdrawable from the bore of the focus coil assembly, an annular connector member surrounding the rear end of the neck portion of the pick-up tube and carrying electrical connections which engage with complementary connections carried by the rear end of the focus coil assembly and an annular locking ring at the rear end of the focus coil assembly which serves to lock the tube and the annular connector member in position.

References Cited in the file of this patent

UNITED STATES PATENTS 2,831,920 Furbush ---------------- Apr. 22, 1958

OTHER REFERENCES

"Proceedings of the I.R.E.," article by J. H. Roe, vol. 35, No. 12, December 1947, pages 1532–1537.